May 1, 1956 — N. E. SPIESS, JR., ET AL — 2,744,066
ION EXCHANGE METHOD AND APPARATUS FOR CONTINUOUS
INTER-ACTION OF LIQUIDS AND SOLIDS
Filed June 4, 1953 — 3 Sheets-Sheet 1

INVENTORS.
NEWTON E. SPIESS, JR. &
MARTIN J. ZENK, JR.
BY
*Campbell, Brumbaugh, Free & Graves*
Their ATTORNEYS

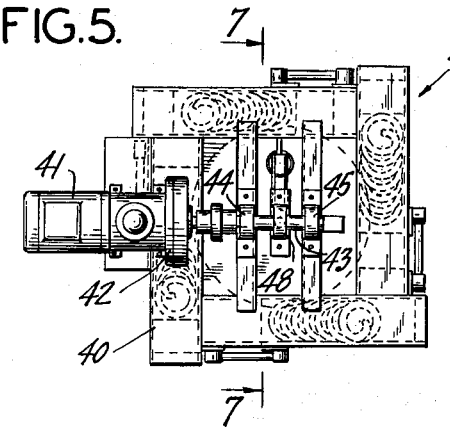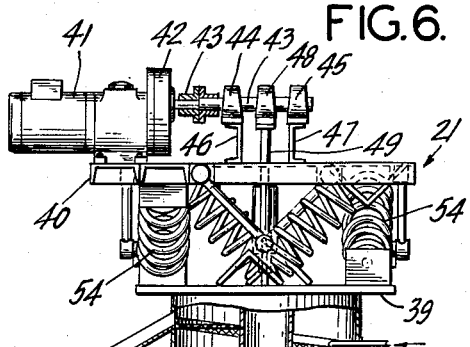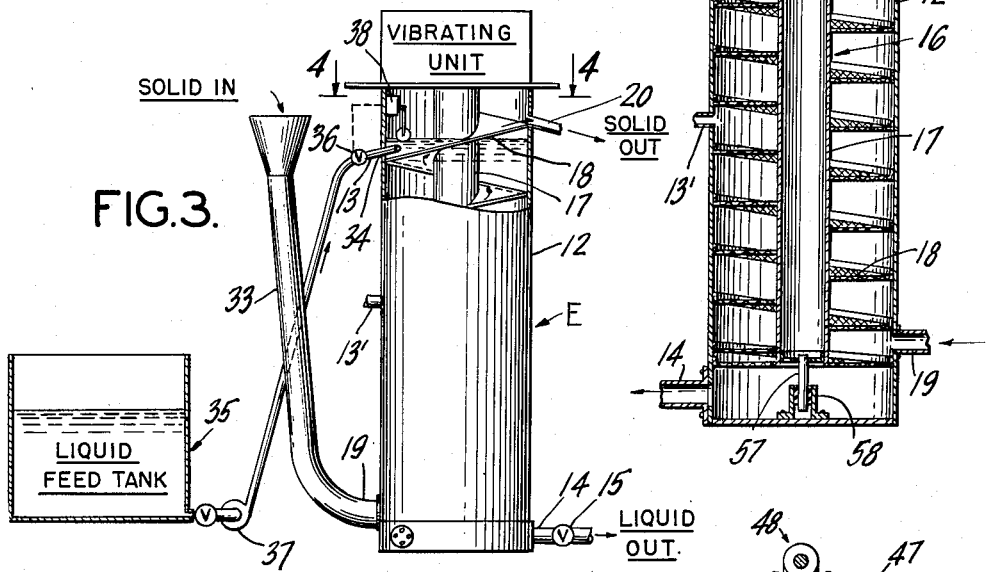

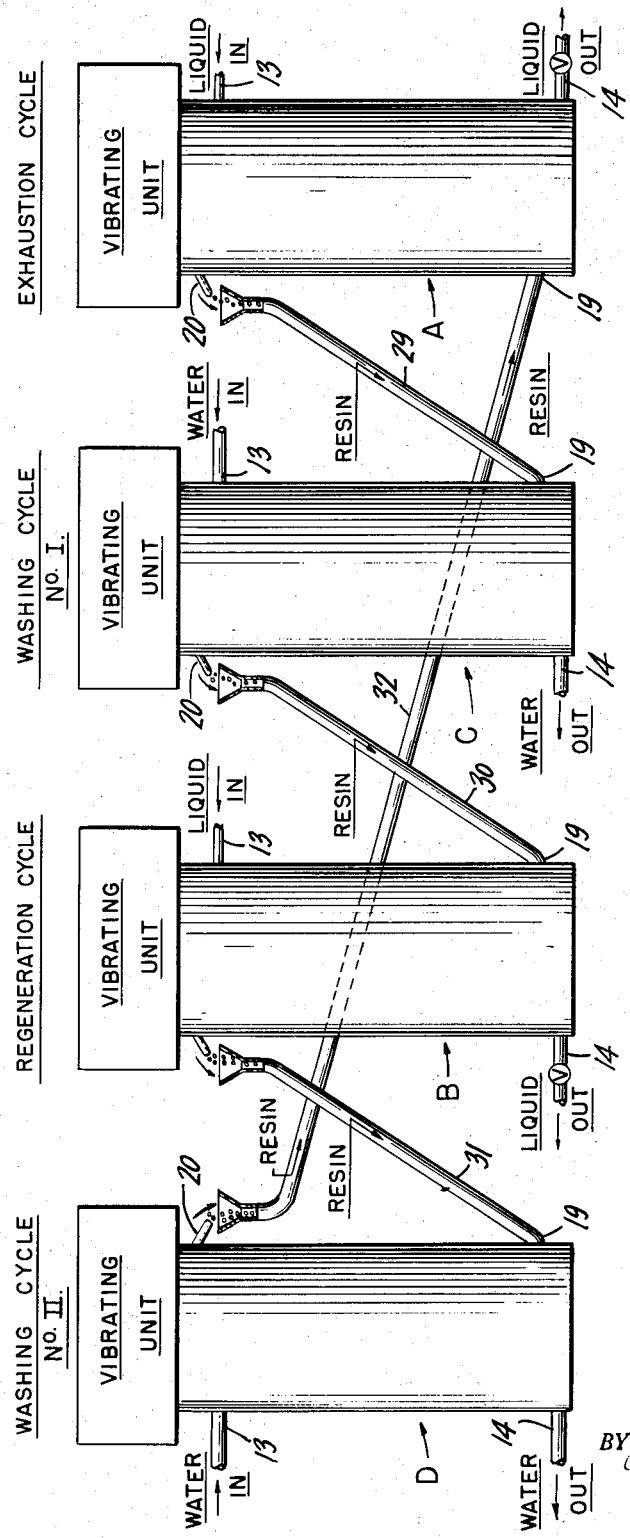

United States Patent Office 2,744,066
Patented May 1, 1956

2,744,066

ION EXCHANGE METHOD AND APPARATUS FOR CONTINUOUS INTER-ACTION OF LIQUIDS AND SOLIDS

Newton E. Spiess, Jr., Oakdale, Islip, and Martin J. Zenk, Jr., West Islip, N. Y., assignors to National Dairy Research Laboratories, Inc., Oakdale, Islip, N. Y., a corporation of Delaware Application June 4, 1953, Serial No. 359,556

12 Claims. (Cl. 210—24)

This invention relates to treating methods and apparatus involving the treatment of solid material with liquids or vice versa and as might be used, for example, in effecting ion exchange between treating resins and a liquid product to be processed.

A conventional means of ion exchange processing involves the use of beds of treating resins through which liquid to be processed is passed until such time as the resin bed becomes exhausted. Flow is then terminated and the resin washed and regenerated, after which the system is again put into operation. This technique, which is commonly known as a fixed bed or batch method, requires close watching to achieve uniform results, is not continuous, and requires an inordinately large physical plant if high output is required. Moreover, the efficiency of both the ion transfer and resin regeneration is usually low and, in the case of treatment of food products, difficulty is encountered maintaining sanitary conditions. With all, the entire operation may be costly and unsatisfactory.

It is, therefore, one object of this invention to provide new and improved methods and apparatus for the treatment of products which overcome the several disadvantages mentioned above.

It is another object of the invention to provide methods and apparatus for bringing solids and liquids into treating relationship as part of a continuous operation.

It is another object of the invention to provide a highly sanitary system for the treatment of food products.

These and other objects and features of the invention may be carried out by means of one or more chamber forming means which provide elongated treating chambers wherein supports are provided for carrying pieces of a solid material in a desired direction within the chamber and wherein means is provided for introducing a liquid into the chamber to be brought into intimate engagement with the solid material at any desired point within the chamber and removed therefrom at any other desired point. The mechanism includes means mechanically to cause the solid material to be advanced as desired within the chamber and to facilitate intimate association of the material and liquid.

More particularly, the objects may be accomplished by means of one or more treating towers comprising upwardly inclined supports, preferably perforate, for carrying pieces of a solid material and providing means for introducing liquid to be brought into intimate engagement with the solid material at one end of the treating tower to cause flow through the solid material and through the perforate support. Concurrently the support is vibrated to cause the solid material to move continuously upward toward a discharge point, with the agitation resulting from the vibration effecting a more intimate association of the liquid and solid materials as well as causing the upward movement of the pieces of solid material.

In one embodiment of the invention the inclined perforate support is in the form of a helix and the liquid is introduced at the top of the tower and caused to flow downwardly through the solid material and the perforate supporting surface with components of motion counter to the direction of movement of the solid material. Of course, if the support were not perforate, the flow of the liquid and solid would be substantially in the same plane. The tower may be maintained full of the liquid by proper adjustment of the input and output flows, and the speed of vibration of the helical surface as well as the pitch thereof are so arranged that the vertical component of velocity of the surface downward is greater than the effective velocity of the solid material downward in the liquid due to gravity and to the velocity imparted to the solid material by means of the downward movement of the liquid.

The treating towers may be multiplied to afford an integrated system wherein the solid material after its discharge from the top of a first treating tower is washed, regenerated, washed again and then reintroduced at the bottom of the first treating tower, all as part of a continuous and balanced operation. The liquid to be treated is introduced into the top of the first tower and withdrawn continuously at a rate which is a function of the throughput of the treating solids. In a preferred system as many as four substantially duplicate towers may be provided, cross-connected and arranged so that the first tower is the treating tower, the second a washing tower, the third a regenerating tower and the fourth a washing tower. The ouput at the top of the latter tower will be solids washed and regenerated and ready to be introduced, as by gravity feed for example, to the bottom of the first or treating tower. Suitable sources of counter flowing water and regenerating liquids are provided in the other towers in amounts correlated with the total output of the system.

For a better understanding of the invention reference may be had to the accompanying drawings, in which:

Figure 3 is a side view, partly in vertical section, showing the details of one form of treating tower;

Figure 4 is a view in transverse section taken on the line 4—4 of Figure 3 looking in the direction of the arrows;

Figures 5 and 6 are, respectively, top and side views of apparatus for causing vibratory motion in the treating towers;

Figure 7 is a view in vertical section of the vibrating apparatus of Figs. 5 and 6 taken on the line 7—7 of Figure 5 looking in the direction of the arrows; and Figure 8 is a side view, schematic in nature, showing a complete system for effecting continuous treatment of a product.

Figure 1:
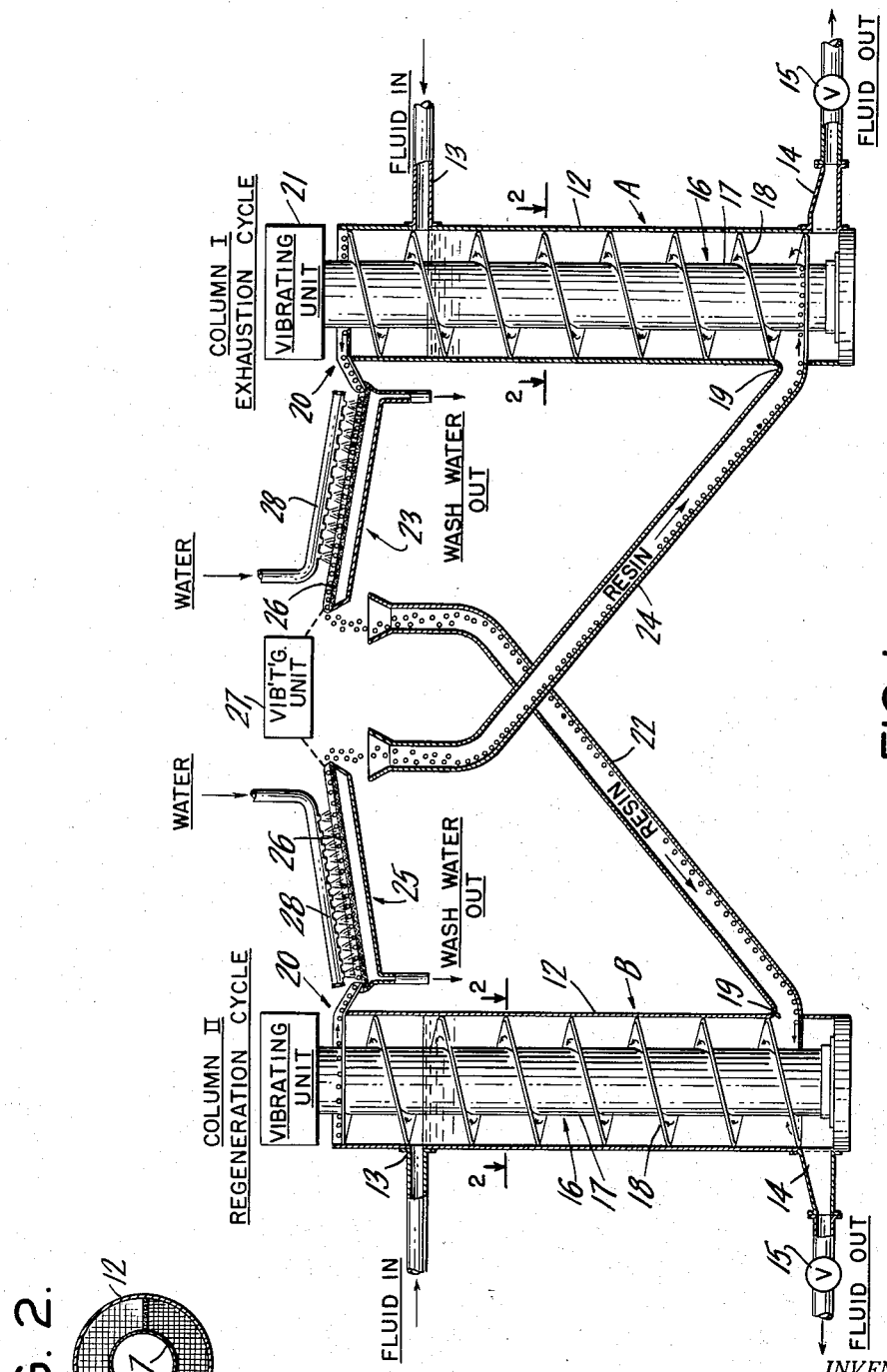
Figure 1 is a side view, schematic in nature and partly in vertical section, of a continuously operable treating system formed in accordance with the present invention.
Figure 2:
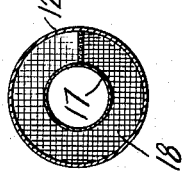
Figure 2 is a view in transverse section taken on either of the lines 2—2 of Figure 1, looking in the direction of the arrows.

In the following specification in which several systems are described to illustrate how the present invention may be applied, a number of treating towers are described. Each of these towers is substantially the same as to its basic structure and mode of operation and, for convenience and simplicity, like components of the respective towers are identified in the drawing by the same reference number.

Referring first to Figure 1 of the drawing, there is shown a treating system utilizing a pair of treating towers A and B cross-connected as described below to afford continuous exhaustion and regeneration cycles. The towers each have a closed, vertical-axis, cylindrical casing 12 entered by a liquid input connection 13 near the upper end and a liquid discharge connection 14 at the lower end, the latter preferably being fitted with a valve 15. The casing 12 houses a vibratable assembly 16, which comprises a central cylindrical column 17 to the outer surface of which is attached a helical support 18 which spirals thereabout for substantially the entire length of the tower. The support 18 is preferably perforate in order that the liquid introduced into the towers at the connection 13 may flow in the toroidal space defined by the inner wall of the casing 12 and the outer wall of the column 17 downwardly to the outlet connection 14. Piercing the casing near its lower end is an input connection 19 for solids which communicates with the lower end of the helical support 18 and piercing the casing near its upper end is an outlet connection 20 for solids which communicates with the helical support 18 near its upper end.

Connected to vibrate the assembly 16 is a vibrating unit identified generally by the numeral 21. Under conditions described more fully at a later point, pieces of solid matter disposed on the support 18 will be caused to move therealong to enjoy intimate association with the flowing liquids. The perforations in the support 18, which may be in the form of a screen, are made sufficiently small to support the pieces of solid material to be used in the system but to permit the counterflowing liquid to pass downwardly therethrough. In this fashion pieces of solid material introduced at the input connection 19 will move upwardly in a helical path while the fluid introduced at the inlet connection 13 near the upper end of the tower will flow downwardly more or less axially of the tower toward the outlet connection 14.

An intimate association between the solid pieces and the liquid will occur as the liquid percolates downwardly through the agitated pieces and the perforate support. The throughput of solids and fluids in the treating tower A should be so arranged that the solid material discharged at the outlet connection 20 near the top of the tower is exhausted in so far as its treating capacity is concerned. As one means of effecting this desired control the valve 15 in the liquid output connection 14 may be adjusted to attain a desired flow rate for the liquid. In this connection it should be noted that in a preferred mode of operation the tower is kept full of the liquid to be treated, the input and output flows being adjusted to achieve this condition.

In order to regenerate the exhausted solids, the latter may be introduced through the inlet connection 19 into the bottom of the tower B via a gravity conduit 22 and, if desired, an interposed washing table 23. The solids introduced into the tower B will climb upwardly to the output connection 20 through a counter-flowing regenerating liquid introduced at the inlet connection 13 and withdrawn at the outlet connection 14 in a manner substantially the same as that described above with reference to the tower A. The output of solids at the upper end of the tower B is reintroduced into the treating tower A at the inlet connection 19 via gravity conduit 24 and, if desired, a second washing table assembly 25. The effectiveness of the washing tables 23 and 25 may be improved by providing vibratory screens 26, which may be actuated by a vibrating unit 27, for example, and through which washing water is sprayed by means of a nozzle assembly 28.

Thus a complete and continuously operable system is provided for treating the fluid product which flows through the treating tower A.

In a working installation patterned after that described above, the fluid to be treated could be a liquid food product introduced at the inlet connection 13 and withdrawn at the outlet connection 14 of the tower A. The treating solids being pieces of resin, and the purpose of the treatment being to effect an ion exchange between the salts in the liquid product and the resins. The exhausted resins are regenerated in the tower B using an acid solution as the regenerating liquid. It will be understood that the resins used may be either all of one type or a mixture of two or more different types and that alkali or salt solutions may also be used as regenerating media.

It should be noted that the parts of the apparatus which are touched by the treating and treated materials are either fully protected or are so arranged that they may be kept free of contamination. The structure of the system and its mode of operation are therefore such that sanitary conditions may be readily achieved and maintained at all times.

Referring to Figure 8, a system is illustrated wherein the washing tables 23 and 25 are replaced by towers C and D which are substantially the same as the towers A and B described above. In this system the exhausted solid material from the treating tower A is discharged from the output connection 20 and flows by gravity through a conduit 29 to the input connection 19 near the base of the tower C. The tower C being a washing tower, a liquid such, for example, as pure water may be introduced near its top through the liquid input connection 13 and discharged at the output connection 14, while the washed solids are discharged at the output connection 20 into a conduit 30, which is inclined downwardly to the input connection 19 of the regeneration tower B. The regenerating fluid is introduced and discharged as described above in connection with Figure 1 by means of the input and output connections 13 and 14.

The output of solids from the top of the tower B is conducted by gravity conduit 31 to the input connection 19 of the second washing tower D, wash fluid being introduced near the upper end at the liquid input connection 13 and withdrawn near the lower end at the liquid output connection 14. The output of solids at the output connection 20 of the second wash tower D is conducted by means of a gravity conduit 32 to the input connection 19 for solids at the lower end of the treating tower A. Thus a highly effective, almost fully closed and continuously operable system is provided.

In accordance with the invention the effectiveness of the treating towers may be improved by means of the arrangement disclosed in Figures 3 and 4 of the drawing. In these Figures there is shown a treating tower E, which may be substituted for any or all of the towers A, B, C and D, and the input connection 19 of which is connected to receive solids from a conduit 33. The liquid input connection 13 is in the form of a nozzle 34 arranged, as best seen in Figure 4, to introduce the stream of liquid in the plane of the support 18 and in the same direction as the flow of the solids upwardly on the support 18. The liquid is derived from a source 35, which may be in the form of a storage tank, for example, and is fed to the discharge nozzle 34 by means of a conduit system including a control valve 36 and a pump 37. The rate of flow of liquid should be suitably controlled by manipulation of the valves 36 and 15 and the pump 37 to maintain a constant liquid level within the cylindrical casing 12. To maintain this condition, a suitable float mechanism 38 may be provided at the upper end of the tower which is linked mechanically to operate the valve 36. In certain cases, as described below in conjunction with Figure 9, it will be desired to introduce supplemental liquid into a tower between its ends. In such cases, a liquid inlet conduit 13' may be provided.

In operation, the vibratable assembly 16 including the helical support 18 may be vibrated at frequencies and at angles such that the vertical component of velocity of the support downwardly of the inclined plane formed by the helix is greater than the effective velocity of the solid particles downward in the liquid due to gravity and due to the velocity imparted to the solid particles by the downward motion of the liquid. To this end, the support may, for example, be inclined to the horizontal at an angle of about 6° for towers of the proportions shown in Figure 3 of the drawing. Effective frequencies for moving the solid material upwardly counter to the flow of the fluid may range, for example, from 6 to 60 cycles per second with amplitudes of vibration from 1/32 to 1/3 of an inch, the larger amplitude being used with the lower frequency and the smaller amplitude with the higher frequency. The angle the plane of vibration of the vibratory assembly 16 makes with the downhill side of the support may be in the vicinity of 20° to 25°. Thus where the support makes an angle of 6° with the horizontal, the angle of vibration will total 26° to 31° with respect to the horizontal. It will be understood therefore that the vibratory motion of the assembly 16 has components which are both angular with respect to the vertical axis of the tower and in alignment therewith.

A representative arrangement for effecting this vibration is shown in Figs. 5–7 of the drawing.

Disposed above the cylindrical casing 12 is a movable platform 39 to which the upper end of the cylindrical column 17 of the vibratory assembly 16 is attached in a driving connection. Disposed above the platform 39 is a stationary centrally apertured platform 40 carrying a prime mover, such for example as an electric motor 41 and a gear box 42, the output shaft 43 of which is journalled in a pair of pedestal bearings 44 and 45 supported respectively on channel beams 46 and 47 which in turn find their support on the stationary platform 40. On the shaft 43 between the pedestal bearings 44 and 45 is an eccentric 48, the connecting rod 49 of which is coupled to the movable platform 39 and vibratable assembly 16. This coupling may include a lever 50 (Fig. 7) having one end pivotally joined to the connecting rod 49 and the other end pivotally joined to the depending end of a fulcrum link 52, which is in turn pivotally joined at its upper end to the stationary platform 40.

Between its ends, the lever 50 is pivotally joined to the movable platform 39 through an upstanding lug 51. It will be seen, therefore, that the lever 50 is connected as a second-class lever and that as the drive shaft 43 is rotated by the prime mover 41, the eccentric driven connecting rod 49 will move up and down causing the movable platform 39 and the vibratory assembly 16 to rise and fall.

In order to impart the necessary angular movement to the vibratable assembly 16, a series of four obliquely disposed swinging links 53 are connected between the stationary platform 40 and the movable platform 39. The swinging links 53 are joined pivotably to the respective platforms 39 and 40 so that as the platform 39 is raised and lowered by the eccentric 48, the links 53 will constrain the platform 39 (and vibratable assembly 16) to move angularly as well as vertically. It will be understood that there is sufficient play in bearings of the linkage including the link 52, the lever 50 and the connecting rod 49 to accommodate the turning motion, which, as stated above, is relatively small. The lower end of the vibratable assembly 16 may carry a vertically disposed bearing pin 57 which is rotatably and slidably journalled in a bearing 58 to accommodate the two degrees of motion.

In order that this motion might be effected with minimum energy input, natural resonance may be utilized, and to this end a series of obliquely disposed coil springs 54 may be provided between the stationary and movable platforms 39 and 40, suitably inclined bearing pads 55 and 56 being provided on the respective platforms 39 and 40 to form abutments for the springs. The direction of inclination of the springs 54 is opposite to that of the swinging links 53, so that the axes of the respective springs are substantially normal to those of the adjacent swinging links. As the vibratable assembly 16 is lifted and as it turns counterclockwise (as viewed in Figure 5), the springs 54 will be compressed and will urge the vibratable assembly 16 in a clockwise direction toward its original position. By proper adjustment of the springs and the linkages a natural period of resonance may be attained which will cause the assembly to vibrate vigorously with minimum input energy.

It is to be understood that the inclined support hereinabove referred to may be imperforate, thus causing the liquid to travel the entire length of the toroidal spaced formed by the helix and following the plane of helical surface rather than percolating through the solid material and the perforate support.

Moreover the manner in which the material is advanced in the treating chamber may be varied as, for example, by vibrating the casing of the treating tower to the inner surface of which the helical support is secured along its entire outer periphery. This may be achieved through mechanism by means of which the tower is either suspended or upon which it may rest. In any event frequencies of vibration and angles of inclination should be utilized which will result in a greater vertical component of velocity downwardly of the inclined plane formed by the helix than the effective velocity of the solid particles downwardly in the liquid due to gravity and to the velocity imparted to the solid particles by the downward motion of the liquid. Where the tower itself is vibrated it will, of course, be necessary to provide flexible connections on the liquid and resin lines.

It should also be understood that the directions of flow of the resin and liquid may be reversed, the resin being introduced at the top of the tower and the liquid at the bottom with discharges respectively at the bottom and top. This would of course necessitate changing the angle of vibratory motion to urge the solid material down the spiral.

The particular forms of the invention described and illustrated in the accompanying drawings are presented as examples of how the invention may be applied. It is to be understood that the phraseology and terminology employed herein is used for the purpose of description and not limitation. Other forms, embodiments and applications of the invention coming within the proper scope of the appended claims will readily suggest themselves to those skilled in the art.

We claim:

1. Treating apparatus comprising an upwardly inclined support for carrying pieces of a solid material, wall means surrounding the support to define a liquid chamber in which the liquid level envelops the support to a point intermediate its extremes, means for vibrating the support to cause pieces of material to move upwardly therealong and means for introducing liquid into the chamber adjacent the upper end thereof, means to withdraw the liquid at the lower end of the tank, said means to introduce and withdraw liquid being arranged to maintain a liquid level in the tank in which the support is partly submerged, means to receive the solids from the upper end of the support to remove them from the treating apparatus, the last said means being above the liquid level, and means to introduce solids onto the vibratable support adjacent its lower end and below the liquid level.

2. Treating apparatus comprising a vertically disposed treating tower, a helical support in the tower spiralling about a vertical axis, and adapted to carry pieces of a solid material, means for vibrating the helical support about a substantially vertical axis to cause material on the support to move upwardly therealong in a helical path toward one end of the tower, wall means defining a liquid chamber about the helical support, and means for introducing a liquid adjacent the upper end of the tower, means to withdraw the liquid adjacent the lower end of the tower, said means to introduce and withdraw liquid maintaining a liquid level in the tower enveloping part of said helical support, whereby the liquid is caused to flow with downward vertical directional components with respect to the tower and with respect to the helically moving material thereon, means to introduce solids onto the support adjacent the lower end of the tower and outlet means to receive solids adjacent the upper end of the tower above the liquid level.

3. Treating apparatus comprising a vertical axis tower, a helical support in the tower spiralling about a vertical axis and adapted to carry pieces of solid material, means for vibrating the support about a substantially vertical axis to cause the material on the support to move upwardly therealong in a helical path toward one end of the tower, a laterally closed vertically disposed casing surrounding the helical support, solids inlet and outlet means communicating respectively with the lower and upper portions of the support and spaced along the axis of the tower for respectively receiving and discharging pieces of the solid material which are passed through the tower, and liquid inlet and outlet means disposed at the upper and lower portions respectively of the tower, said inlet and outlet means being adapted to maintain a liquid level in the tower enveloping a portion of the support and for establishing a flow of the liquid medium downwardly through the tower to be brought into contact with the pieces of solid material moving upwardly, the solids outlet adjacent the upper end of the tower being disposed above the liquid level.

4. Apparatus according to claim 3 wherein the support is perforate.

5. Treating apparatus as set forth in claim 3 said casing being substantially cylindrical, and a substantially cylindrical column disposed coaxially within the said casing to define therewith a toroidal chamber containing said helical support.

6. Treating apparatus as set forth in claim 3, said inlet means for the liquid being disposed near the upper end of the tower and comprising nozzle means directed upwardly in the plane of inclination of the helical support and substantially tangentially with respect to the angular vibration of the support about the said vertical axis, said inlet means for the liquid medium being disposed below an interface between the liquid medium and air, which interface is slightly above said nozzle means, said outlet means for the solid material being disposed above the interface whereby the solid material moves upwardly along the support to pass through the zone of introduction of the liquid medium and through the interface.

7. Treating apparatus as set forth in claim 1 said means for introducing liquid including nozzle means near the upper end of the support directed upwardly along the support in the direction of movement of the pieces of solid material.

8. Apparatus according to claim 7 wherein the support is perforate.

9. In a method of countercurrent treatment involving the interaction of liquids and solids using an enclosed upwardly inclined support, the steps of disposing pieces of a solid material on the inclined support, enveloping at least a portion of the inclined support and solid material thereon in a treating liquid mass, passing the liquid mass among the pieces of solid material with components of motion downwardly, and vibrating the support by imparting thereto motions including horizontal components and vertical components, the latter having a downward velocity which exceeds the effective velocity of the pieces of the solid material downwardly in the liquid mass due to gravity and due to the velocity imparted to the pieces of solid material by means of the downwardly moving liquid mass, thereby to cause the pieces of solid material to move up the inclined support with directional components counter to the moving liquid mass, the solids thereby moving upwardly through the liquid mass and through the air-liquid interface at the upper end of the liquid mass, and withdrawing the solids from the support above the liquid level.

10. An ion exchange method comprising continuously supplying an ion containing resin to a treating zone and an upwardly inclined surface, subjecting said surface periodically to vibratory movements to cause said resin to move upwardly on said surface and removing the resin from the zone at a point above the point at which the resin is supplied to the zone, introducing a liquid to the zone with upwardly directed velocity components and causing the liquid to come into contact with the resin by maintaining the zone filled with the liquid, and removing the liquid from the zone at a point below the point at which it is introduced into the zone thereby causing the liquid to flow in the zone in a direction contrary to the direction of movement of the resin, said vibratory movements having horizontal velocity components and vertical velocity components downward that are greater than the effective velocity of the particles downward in the liquid due to gravity and due to the velocity imparted to the particles by the downward motion of the liquid.

11. Treating apparatus as set forth in claim 1, said solids inlet including a liquid-tight tube portion extending upwardly for a distance exceeding the liquid level in the tank, and means to introduce the solids into the upper end of the pipe to pass downwardly therethrough onto the vibratable support.

12. A treating apparatus as set forth in claim 11 including a second treating apparatus substantially identical to the first and means to pass the solids from the first treating apparatus to the lower portion of the vibratable support of the second and means to pass the solids from the upper solids outlet of the second tower to the lower portion of the vibratable support of the first.

References Cited in the file of this patent

UNITED STATES PATENTS

| | | |
|---|---|---|
| Re. 22,904 | Carrier | Aug. 12, 1947 |
| 1,611,098 | Borner | Dec. 14, 1926 |
| 1,671,864 | Higgins | May 29, 1928 |
| 1,707,302 | Godsey | Apr. 2, 1929 |
| 1,770,580 | Neumann | July 15, 1930 |
| 2,150,608 | Olier | Mar. 14, 1939 |
| 2,241,646 | Rathjens | May 13, 1941 |
| 2,508,884 | Hereng | May 23, 1950 |
| 2,528,099 | Wilcox et al. | Oct. 31, 1950 |
| 2,542,587 | Smith | Feb. 20, 1951 |
| 2,559,257 | Obey | July 3, 1951 |
| 2,572,848 | Fitch | Oct. 30, 1951 |
| 2,658,286 | Spurlin | Nov. 10, 1953 |
| 2,658,609 | Weyandt | Nov. 10, 1953 |